Sept. 18, 1945.　　　　C. E. RIST　　　　2,385,103
SAFETY STOP MECHANISM FOR MACHINE TOOLS
Filed March 27, 1944　　　3 Sheets-Sheet 1

Inventor
C. E. Rist
By Robb Robb
Attorneys

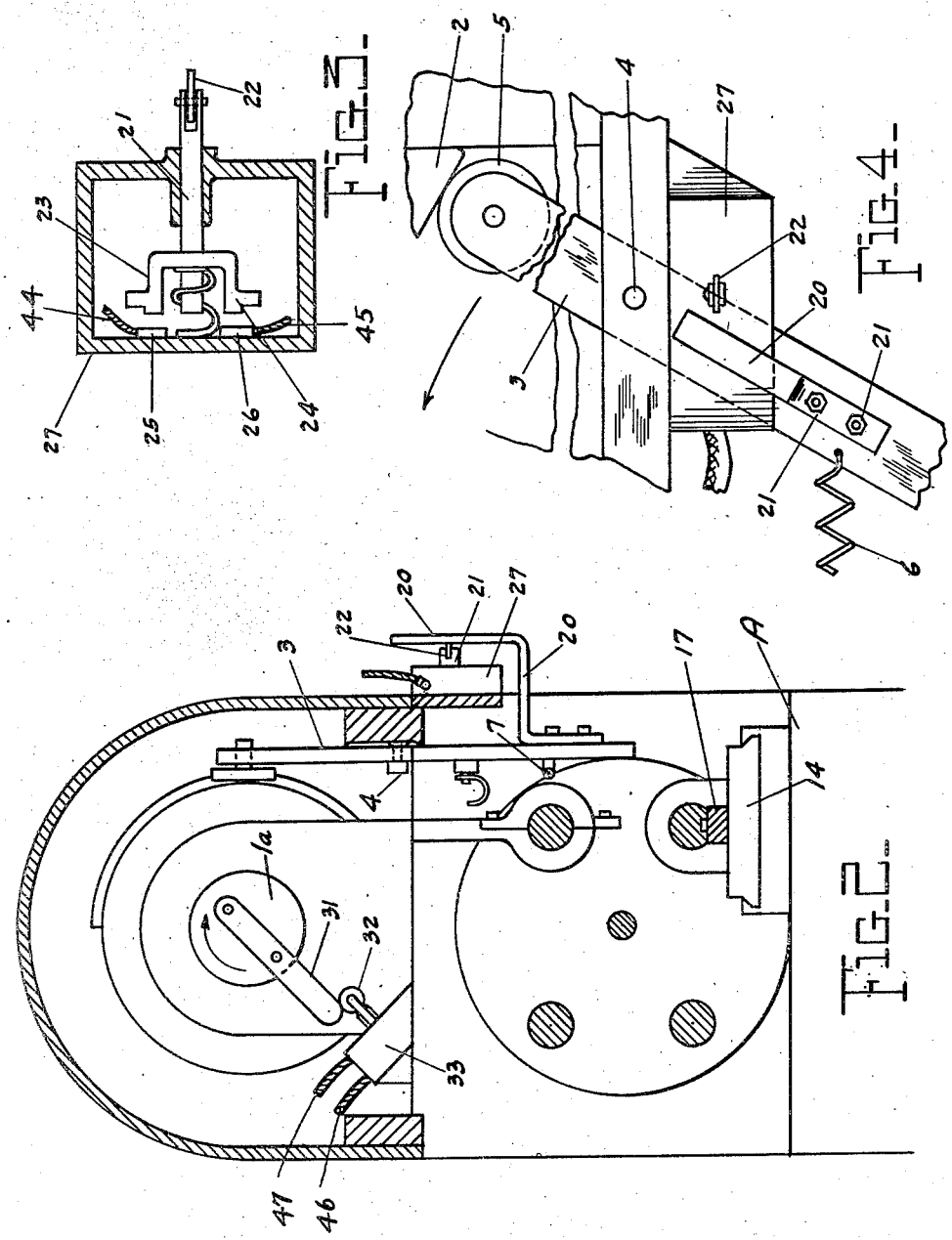

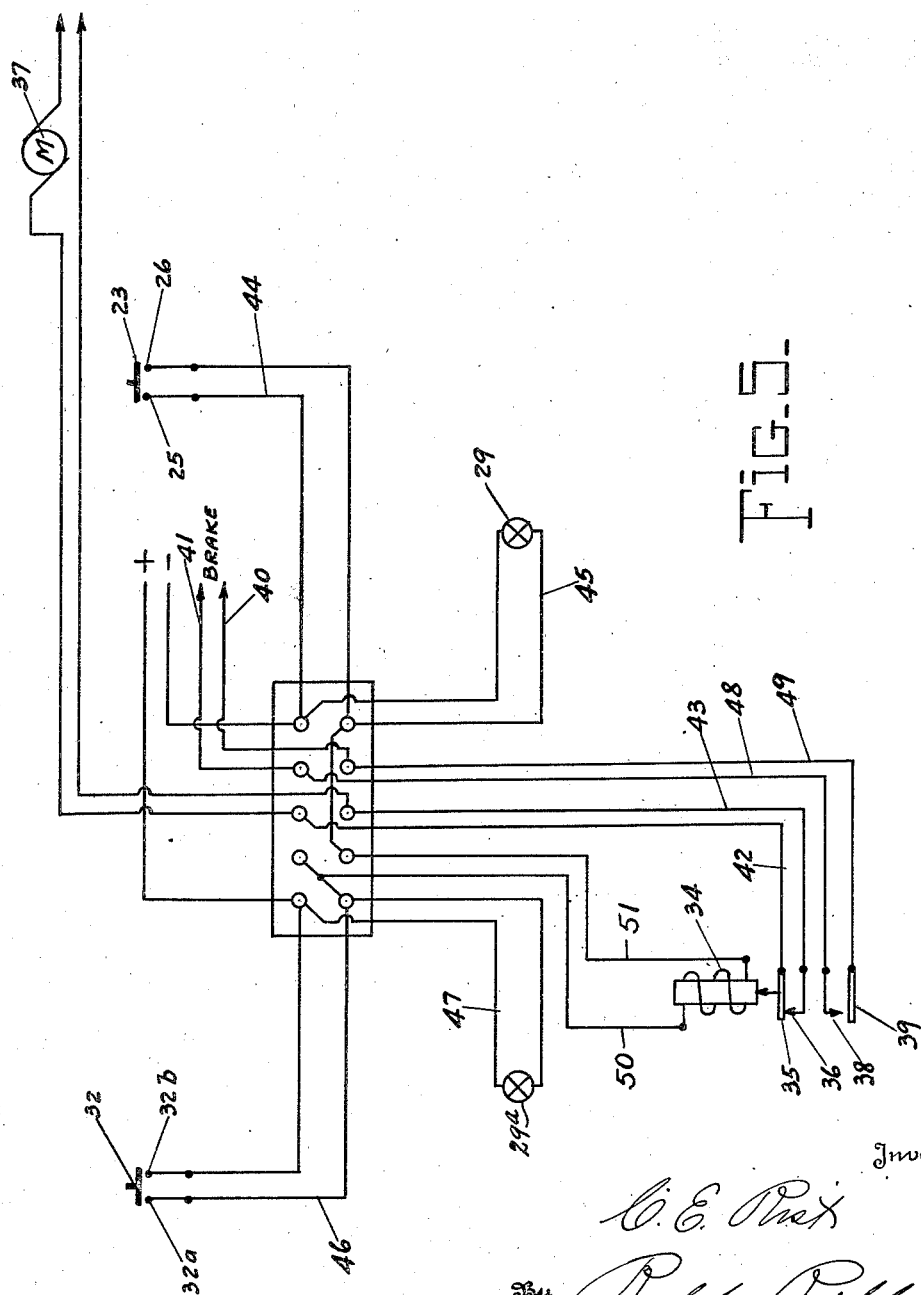

Patented Sept. 18, 1945

2,385,103

UNITED STATES PATENT OFFICE 2,385,103

SAFETY STOP MECHANISM FOR MACHINE TOOLS

Clarence E. Rist, Lyndhurst, Ohio

Application March 27, 1944, Serial No. 528,322

15 Claims. (Cl. 10—129)

This invention pertains to improvements in safety appliances or mechanism designed particularly to be used in conjunction with machine tools, and primarily adapted to discontinue the automatic operation of automatic machines of this class to avoid liability of damage or breakage of a part or parts of a machine in the event of improper operation of such part or parts.

More specifically, my invention has been applied to automatic tapping machines in which the customary operation of the machine effects the advancing movement of a tap or tapping tool into the work and withdraws the same after the tapping operation is completed. In certain automatic machines of the above class the tap, which is automatically operated in reverse rotational directions for tapping an opening and then withdrawing therefrom, sometimes becomes stuck in the tapped hole or opening, and since the work spindle is automatically operated also to bring fresh stock into position to be operated upon by the tap, the failure of the tap to be withdrawn from the work will result in warping or breakage of the spindle or tool or other damage to the machine. It is therefore the primary purpose of the present invention to provide a safety device which under the conditions above mentioned, namely, when the tap for some reason or other fails to be withdrawn from the work, will shut down the machine by discontinuing the operation of the driving motor therefor, the said shutting off of the motor taking place practically instantaneously with the failure of withdrawal movement of the tap in the time cycle of its work.

Another object of the invention has been to provide safety mechanism of the class described which is susceptible of being emplaced upon a machine or machines of known types, utilizing the control arm which operates to effect the withdrawal of the tap from the work as the primary control member for the discontinuance of the operation of the machine in the event of the withdrawal action failing to carry the tap from the work.

The mechanism of the invention furthermore involves the employment of electrical means whereby the desired action of stopping the machine upon an abnormal condition of operation of the tapping instrumentalities may be effected.

My invention is illustrated in one of its preferred forms in conjunction with an automatic tapping machine of a type commonly known as the Conomatic, and, while the invention is disclosed in conjunction with its operating functions as respects the above type of machine, it is to be understood that the principle of construction utilized might be adapted to other types of automatic machine tools.

In the accompanying drawings:

Figure 2 is a sectional view taken through the machine approximately on the line 2—2 of Figure 1 and looking from the left end of the machine, the controlling features of my safety mechanism being disclosed as when arranged in working positions upon the machine.

Figure 3 is a detail sectional view of one of the control switches, namely that located adjacent to and cooperating with the side lever arm by which the tapping spindle is moved to carry the tap to the work and to withdraw it from the work.

Figure 4 is an enlarged view showing somewhat more clearly the side lever arm and its relation to the switch mechanism that is operated thereby.

Figure 5 is a general layout view diagrammatically depicting the electric circuit connections availed of for the operation of the cooperating parts of the safety mechanism and the parts of the machine that are controlled thereby.

Figure 1:
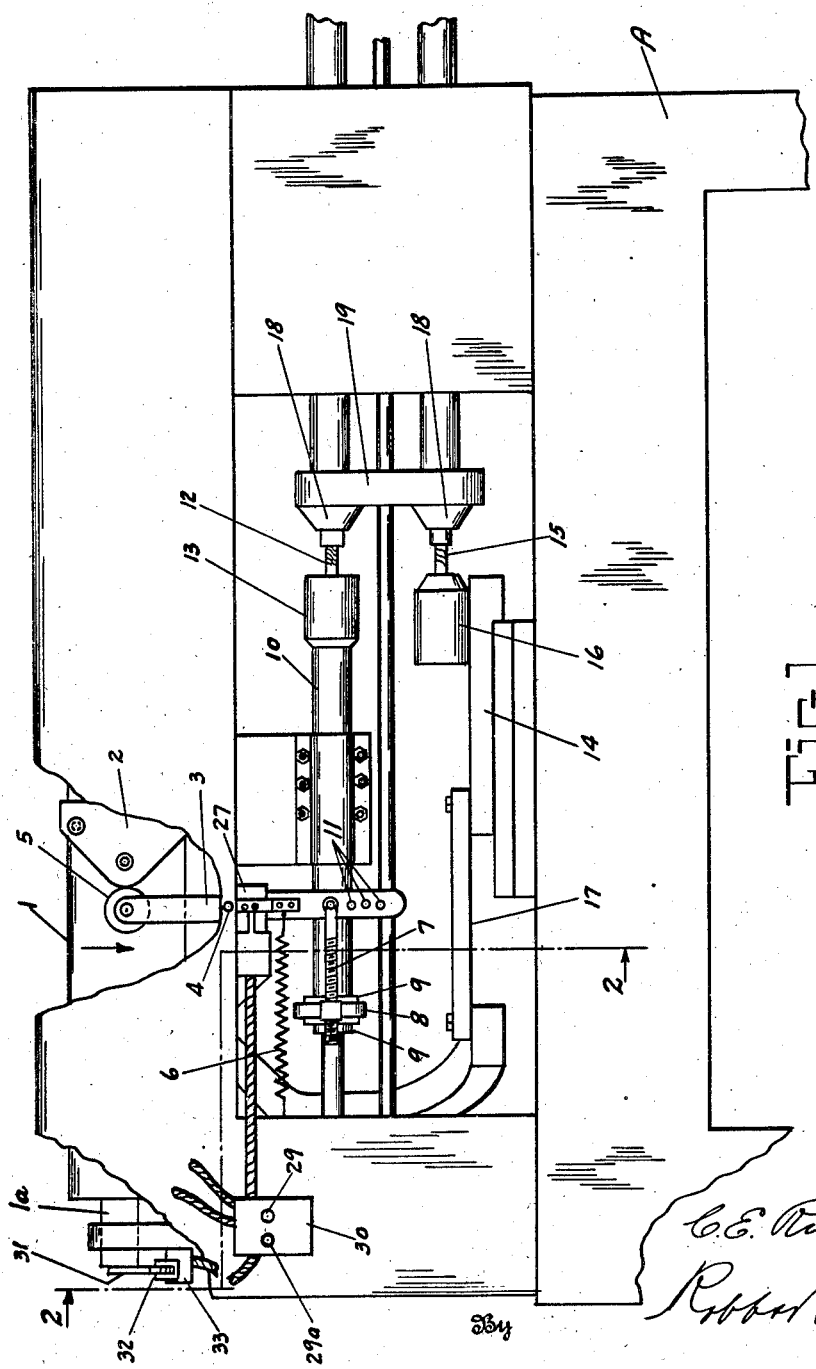
Figure 1 is a somewhat diagrammatic view of the portions of the so-called Conomatic machine that are involved in the combination with the safety mechanism of my invention, portions of the machine being broken away and certain parts of the machine not being shown at all because not concerned with the features of the invention.

As previously indicated, the machine illustrated in the accompanying drawings is a tapping machine of the four-spindle Conomatic type produced by Cone Automatic Machine Company, Inc., and commonly in use today. This machine involves generally a suitable supporting base and frame A, at the upper portion of which is mounted the cam drum 1, carried by a cam drum shaft 1a suitably journaled in the superstructure framework of the machine. The cam drum 1 carries upon its surface a number of cams for controlling the automatic operations performed by the machine in a well known manner, one of these cams designated 2 being shown as cooperating with the side lever arm 3 which is suitably pivoted to the frame of the machine at 4. At the upper end of the lever arm 3 there is carried the roller 5 which travels on the cam surface of the cam 2 and is caused to be rocked in opposite directions by such travel action. The roller 5 is pressed into contact with the cam portion of the member 2 by means of a spring 6 attached at one end to the frame of the machine and at the other end to the lever arm 3 below the pivot 4 of the latter, the tension of the spring 6 urging the roller 5 into its travel contact with the cam 2 in a rightward direction as viewed in Figure 1. At its lower end the lever arm 3 is adjustably connected by a threaded rod 7 to a collar 8 swivelly mounted between spaced annular projections 9 on the tapping spindle 10, and the rod 7 is in turn adapted to be adjustably connected with the lever arm 3 by the provision of a series of openings 11 in the lower portion of said arm. The parts designated 7, 8, and 11 therefore provide for variation in the throw or movement of the arm 3 for correspondingly varying the extent of movement of the tapping spindle 10 and the tap 12 which is mounted on the spindle 10 by the holder 13 of known construction. The tapping spindle 10 is rotated by the customary mechanism provided for this purpose in the machine and will turn in either of opposite directions under the action of suitable reversing gearing timed for proper sequential operation by cam means (not shown) on the drum 1.

It is obvious from the foregoing that through the provision of the cam 2 cooperating with the roller 5 of the arm 3, said arm will be rocked rightward and leftward at its upper end and such movement will be communicated through the rod 7 to the collar 8 and spindle 10, whereby to advance the tap 12 into the work and effect its withdrawal or releasing reverse movement.

There may be provided beneath the tapping spindle 10 a suitable tool slide as indicated at 14 which carries the tool such as a drill 15 mounted in the drill holder 16, said slide 14 being positively actuated in opposite directions by a drive link 17 from suitable mechanism provided in the machine. Thus a hole will be drilled in the stock by means of the drill 15 previous to the turning of the work spindle and collet to bring the work into position with said hole in alinement with the tap 12 for the subsequent tapping of the hole by the operation of the latter. The work spindles 18 are mounted in a suitable rotating carrier 19 after the known manner, the latter being automatically turned to progressively bring the stock into position to be operated upon by the various tools of the machine under the control of cam means on the cam drum 1.

With the above understanding of the construction of the Conomatic machine illustrated, it is notable that my invention involves the provision on the lever arm 3 of an actuating member 20 of somewhat L-shaped bracket form, said member being detachably secured to the arm at 21 and having its upper end spaced somewhat from the outer side of the arm 3. The actuating member 20 is arranged so that in the movement of the lever arm 3 it may strike the roller 22 of a switch member 21 carrying at its inner end, see Figure 3, the contact members 23 and 24 cooperable with spaced contacts 25 and 26 in the switch box 27. Suitable circuit wires or contactors 44, 45 lead from the contacts 25 and 26 and form a part of the general electric control circuit to be later described.

The action of the switch means in the switch box 27 is in part to control a signal light 29 in the signal box 30 located at the left hand end of the machine and attached in any suitable way to the frame of the latter. The effective action of the switch 27 is to produce a short-circuiting effect of the electric circuit including the light 29, so as to turn said light off periodically in the normal movement of the lever arm 3 and primarily when the tap 12 has been withdrawn from the stock held by the work spindle.

In like manner the cam drum shaft 1a, previously referred to, which turns with the drum 1, is equipped with an actuating arm 31 adapted to strike a roller 32 of a switch member of the switch box 33 located on the frame of the machine at the left end thereof. During the turning of the cam drum shaft 1a, when the switch arm 31 rotating therewith actuates the roller 32 of the switch member of the box 33, the resulting action is to control a part of the electric circuit including the second signal light 29a of the signal box 30 for momentarily turning out said light, and this action is performed by short-circuiting the circuit to the light 29a similarly to the action of the switch member 21 as previously described. The switch box 33 and switch members therein contained are substantially identical with the members described in reference to the switch box 27 and shown in Figure 3.

In the general operation of the invention, the cam drum 1 rotates in the direction of the arrows in Figures 1 and 2, causing the lever arm 3 to pivot from the position shown in Figure 4 to the position shown in Figure 1. The pilot or signal lights 29 and 29a are normally lighted. When the arm 3 is swung to the position substantially as in Figure 1, the actuating member 20 causes inward movement of the switch member 21 and establishes connection between the contacts 25 and 26 through the contact member 23, the expanding movement of the spring 6 of course pulling the lever 3 to the left at its lower end, and the cooperation of the contact members 23, 25, and 26 completes the circuit means for the invention to short-circuit the light 29 causing the latter to go out.

The lever arm 3 is now, as stated, in substantially the position of Figure 1, and slight further rotation of the cam drum 1 normally permits the roller 5 on the arm 3 to move clockwise, see Figure 1, through the action of the spring 6 so as to thus withdraw the tap 12 from the work.

If, for some reason, however, the tap 12 cannot be withdrawn, the slight further rotation of the cam drum 1 above referred to will cause the arm 31 of the cam drum shaft 1a to so operate the switch member 32 of the switch box 33 as to connect contacts similar to those previously described as used in the box 27. In this manner a circuit is completed, causing the pilot light 29a to go out by short-circuiting same, and at the instant the spaced contacts of the switch box 33 are connected to complete the circuit in which the switch parts 23, 25, and 26 are included, a suitable solenoid 34 in the general electric circuit including the parts will be energized, thereby separating contacts 35 and 36. This action effects a breaking of a motor control circuit including a motor 37 to instantly stop the machine and thus prevent the operation of the work spindles such as would be performed were the tap 12 withdrawn and this operation permissible in the normal action of the machine.

Under certain conditions, it may be desirable that the motor of the machine be facilitated in its immediate stopping operation by the employment of a magnetic brake, and for this purpose there are provided special contacts 38 and 39 in the general control electric circuit, which contacts will be connected by the action of the solenoid 34 at the same time that the contacts 35 and 36 are separated. In this way the contacts 38 and 39 will cause a portion of the general circuit to be completed so as to energize the magnetic brake connected with the circuit wires 40 and 41, thereby effecting a stoppage of the main motor of the machine instantly.

From the foregoing, it is to be understood that unless the switch members 21 and 32 are actuated at the same time, their operation only effects an intermittent turning off of the pilot or signal lights 29 and 29a, and there will be no disconnection of the main control circuit conductors to stop the machine. In other words, the machine will continue its normal operation with the periodical turning on and off of the lights 29 and 29a unless the movement of the lever arm 3 is practically stopped by the failure of withdrawal of the tap 12 from the work.

Reference will now be made to the general circuit diagram of Figure 5, certain parts of the circuit having been previously mentioned above in giving the general operation of the machine.

In reference to the electrically operated lights, switches, and motor 37, I may use any preferred electric circuit arrangements for coordinating the operation of the various parts as hereinbefore described. The circuits illustrated in Figure 5 include the motor circuit comprising the conductors 42 and 43 leading from the solenoid 34 controlled contacts 35 and 36 respectively to the motor 37 and connected with the power source for the motor.

The switch means 21—23 is included in the shorting circuit which comprises the conductor 44 leading from the contact 25 to the pilot light 29, conductor 45, back to contact 26.

The switch 32 is cooperative with contacts 32a and 32b, and the shorting circuit of the light 29a includes conductor 46 leading from contact 32a to light 29a and conductor 47 leading from said light back to contact 32b. The magnetic brake circuit includes the wires or conductors 48 and 49 leading from the contacts 38 and 39, respectively, to the brake (not shown).

The control solenoid 34 is connected in the above circuits as shown in Figure 5 by the conductors 50 and 51 establishing a control such that when both switch units 21—23 and 32, 32a, and 32b are closed, solenoid 34 is energized to break the motor circuit 42—43 and stop the motor, at the same time energizing the brake circuit 48 and 49 to apply the brake to the motor.

While the brake means may be dispensed with, the same is preferably employed as described above.

Normally in the regular and proper operation of the machine the switch 21—23 is open when the switch 32 is closed and vice versa. It is only when these two switch means are closed at the same time, due to failure of withdrawal of the tap from the work, that the circuit of the motor 37 is broken to thereby stop the latter and avoid the damaging effects that would ensue were the operation of the machine continued under such conditions.

The circuit wires are preferably disposed largely on a panel in the signal box 30.

By my construction described, an operator located some distance from the machine, by observing the lights 29 and 29a can observe that the machine operation is normal if these lights work separately and intermittently; when they both go out simultaneously the stoppage of the machine is made known. The visual lights 29a and 29 may be used with, or have substituted therefor, bells or audible signals.

Having thus described my invention, what I claim as new and desire to secure by Letters Patent of the United States, is:

1. In combination, an automatic machine comprising power means for driving same, an operating tool automatically movable to and withdrawable from the work in the operation of the machine, an automatically movable work carrier to carry the work into position for operating thereon by said tool, an actuating member for moving said tool, and automatic control means including a part on said actuating member for stopping the operation of the machine when said actuating member fails to withdraw the tool from the work during the automatic cycle of operation of the machine.

2. In combination, an automatic machine comprising power means for driving same, an operating tool automatically movable to and withdrawable from the work in the operation of the machine, an automatically movable work carrier to carry the work into position for operating thereon by said tool, an actuating member for moving said tool, and automatic control means for stopping the machine and comprising instrumentalities operable by and coordinately controlled from the means operating the said work carrier and said tool actuating member.

3. In combination, an automatic machine comprising power means for driving same, an operating tool automatically movable to and withdrawable from the work in the operation of the machine, an automatically movable work carrier to carry the work into position for operating thereon by said tool, an actuating member for moving said tool, and automatic control means for stopping the machine including a cam drum having cams for controlling the movement of the work carrier and said actuating member, and instrumentalities rendered operable by relation of the positions of the said drum and actuating member including coacting parts operated by said actuating member and a cam of said drum.

4. In combination, an automatic machine comprising power means for driving same, an operating tool automatically movable to and withdrawable from the work in the operation of the machine, an automatically movable work carrier including a work spindle to carry the work to a position for operating thereon by the tool, a cam drum operating to control the said carrier movement, a tool actuating member operated by said drum, and means including a part on the actuating member operable on its failure to withdraw the tool from the work in the work spindle, and a part operated by said cam drum in a certain position of the drum, for automatically stopping the machine.

5. In combination, an automatic machine comprising power means for driving same, an operating tool automatically movable to and withdrawable from the work in the operation of the machine, an automatically movable work carrier including a work spindle to carry the work to a position for operating thereon by the tool, a cam drum operating to control the said carrier movement, a tool actuating member operated by said drum, and means including a part on the actuating member operable on its failure to withdraw the tool from the work in the work spindle, and a part operated by said cam drum in a certain position of the drum, for signalling to the operator abnormal operation of the machine and that the tool and its supporting parts are in position to be damaged by the movement of the work carrier.

6. A machine as claimed in claim 5, in which the signalling means is also operable to indicate that the work carrier and tool actuating means are operating normally.

7. A machine as claimed in claim 5, combined with instrumentalities for at such time automatically stopping the machine.

8. A machine as claimed in claim 5, in which the signalling means is also operable to indicate that the work carrier and tool actuating means are operating normally, said signalling means operating non-simultaneously to indicate the normal operation of the machine, and instrumentalities to stop the machine if and when said signalling means operate at the same time.

9. In combination, an automatic machine comprising power means for driving same, an operating tool automatically movable to and withdrawable from the work in the operation of the machine, an automatically movable work carrier including a work spindle to carry the work to a position for operating thereon by the tool, a cam drum operating to control the said carrier movement, a tool actuating member operated by said drum, and means operable by the actuating member on its failure to withdraw the tool from the work in the work spindle to automatically stop the machine.

10. In combination, an automatic machine comprising power means for driving same, an operating tool automatically movable to and withdrawable from the work in the operation of the machine, an automatically movable work carrier including a work spindle to carry the work to a position for operating thereon by the tool, a cam drum operating to control the said carrier movement, a tool actuating member operated by said drum, and means controlled by the actuating member on its failure to withdraw the tool from the work in the work spindle coacting with said drum to prevent the drum from operating to cause movement of said carrier.

11. In combination, an automatic machine comprising power means for driving same, an operating tool automatically movable to and withdrawable from the work in the operation of the machine, an automatically movable work carrier including a work spindle to carry the work to a position for operating thereon by the tool, a cam drum operating to control the said carrier movement, a tool actuating member operated by said drum, and coacting means between said actuating member and drum controlled by the actuating member on its failure of movement to withdraw the tool from the work in the work spindle to electrically cut off the power supplied to the machine for driving the same.

12. A machine as claimed in claim 1, in which said automatic control means includes an electric power cut-off instrumentality, and signals operable to indicate normal proper operation of the machine, and for indicating when the machine has been automatically stopped.

13. In combination, an automatic machine comprising power means for driving same, an operating tool comprising a tap automatically movable to and withdrawable from the work in the operation of the machine, an automatically movable work carrier to carry the work into position for operating thereon by said tool, an actuating member for moving said tool, and automatic control means for stopping the operation of the machine when said actuating member fails to move to a position to withdraw the tool from the work during the automatic cycle of operation of the machine, and means for moving the work carrier coacting with and included in said automatic means.

14. In combination, an automatic machine comprising power means for driving same, an operating tool automatically movable to and withdrawable from the work in the operation of the machine, an automatically movable work carrier including a work spindle to carry the work to a position for operating thereon by the tool, a cam drum operating to control the said carrier movement, a tool actuating member operated by said drum, an instrumentality movable by said actuating member, an instrumentality operable with said drum, and means connected with and operable when said last two instrumentalities assume predetermined positions, for automatically stopping the machine.

15. A machine as claimed in claim 14, combined with signalling means operated by said instrumentalities when they stop the machine.

CLARENCE E. RIST.